United States Patent
Logan

(10) Patent No.: US 10,618,429 B2
(45) Date of Patent: Apr. 14, 2020

(54) CONTACT WIRE CLAMPS

(71) Applicant: AFL Telecommunications LLC, Duncan, SC (US)

(72) Inventor: James D. Logan, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 15/929,081

(22) Filed: Jan. 3, 2019

(65) Prior Publication Data

US 2019/0232816 A1 Aug. 1, 2019

Related U.S. Application Data

(60) Provisional application No. 62/625,017, filed on Feb. 1, 2018.

(51) Int. Cl.
| | |
|---|---|
| *B60M 1/12* | (2006.01) |
| *F16L 3/10* | (2006.01) |
| *H02G 7/08* | (2006.01) |
| *H02G 3/04* | (2006.01) |
| *B60M 1/24* | (2006.01) |

(52) U.S. Cl.
CPC ............... *B60M 1/12* (2013.01); *B60M 1/24* (2013.01); *F16L 3/1091* (2013.01); *H02G 3/0456* (2013.01); *H02G 7/08* (2013.01)

(58) Field of Classification Search
CPC ...... B60M 1/12; F16L 3/1091; H02G 3/0456; H02G 7/08
See application file for complete search history.

(56) References Cited

U.S. PATENT DOCUMENTS

| | | | | |
|---|---|---|---|---|
| 2,404,088 | A * | 7/1946 | Pinkerton | B60M 1/12 191/33 R |
| 5,014,941 | A * | 5/1991 | Sherman | G02B 6/4439 24/135 K |
| 6,595,472 | B1 * | 7/2003 | Pisczak | G02B 6/483 248/74.1 |
| 9,696,512 | B2 * | 7/2017 | Miller | G02B 6/4459 |
| 10,095,001 | B2 * | 10/2018 | Sakmar | H02G 3/32 |

* cited by examiner

*Primary Examiner* — Anita M King
(74) *Attorney, Agent, or Firm* — Dority & Manning, P.A.

(57) ABSTRACT

A contact wire clamp includes a first clamp body and a second clamp body. The first clamp body and second clamp body each define a contact wire channel and a safety rope channel. The safety rope channel includes a plurality of ridges, each of the plurality of ridges spaced apart from neighboring ridges to define a plurality of troughs. The contact wire clamp further includes a mechanical fastener connecting the first clamp body and the second clamp body together. The safety rope channels of the connected first clamp body and second clamp body face each other and together form a safety rope passage.

18 Claims, 5 Drawing Sheets

CONTACT WIRE CLAMPS

PRIORITY STATEMENT

The present application claims priority to U.S. Provisional Patent Application Ser. No. 62/625,017, filed Feb. 1, 2018 and which is incorporated by reference herein in its entirety.

FIELD

The present disclosure relates generally to contact wire clamps, and more particularly to contact wire clamps which provide improved safety rope slip prevention.

BACKGROUND

Contact wire clamps are utilized in the rail industry to, for example, support feeder jumpers or hangers in a catenary type arrangement. In many cases, the clamps are used in non-slip type applications. When in use for feeder jumpers, for example, there are no loads applied to the clamp other than small wind loads and the dead weight of the feeder jumper cable. However, in some cases, such clamps are utilized in application which have slip potential.

For example, in compound type catenary applications the clamp provides for support of a safety cable (also referred to herein as a safety rope) running directly above the contact wire, and there may or may not be a certain degree of tension in the cable. The application is still a no-load type of assembly for the clamps. However, known clamps are not sufficiently capable of keeping certain types of ropes, such as for example KEVLAR (poly-paraphenylene terephthalamide) ropes (such as PhillyStran or Parafil products) from slipping due to loadings caused by an outside force. Such safety ropes are used to prevent catastrophic failures should the contact wire have a breakage. Should a breakage happen, the safety rope will have a sudden increase in tension and as a result, with currently known clamps, the safety rope could slip through the clamp body.

Accordingly, improved contact wire clamps are desired. For example, contact wire clamps which provide improved safety rope slip prevention would be advantageous.

BRIEF DESCRIPTION

Aspects and advantages of the invention will be set forth in part in the following description, or may be obvious from the description, or may be learned through practice of the invention.

In accordance with one embodiment, a contact wire clamp is provided. The contact wire clamp includes a first clamp body and a second clamp body. The first clamp body and second clamp body each define a contact wire channel and a safety rope channel. The safety rope channel includes a plurality of ridges, each of the plurality of ridges spaced apart from neighboring ridges to define a plurality of troughs. The contact wire clamp further includes a mechanical fastener connecting the first clamp body and the second clamp body together. The safety rope channels of the connected first clamp body and second clamp body face each other and together form a safety rope passage.

In accordance with another embodiment, a contact wire clamp is provided. The contact wire clamp includes a first clamp body and a second clamp body each extending between a first end and a second end. The first clamp body and second clamp body each define a contact wire channel and a safety rope channel which extend in parallel to each other. The safety rope channel includes a plurality of arcuate ridges, each of the plurality of ridges spaced apart from neighboring ridges to define a plurality of arcuate troughs. The contact wire clamp further includes a mechanical fastener connecting the first clamp body and the second clamp body together. The safety rope channels of the connected first clamp body and second clamp body face each other and together form a safety rope passage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
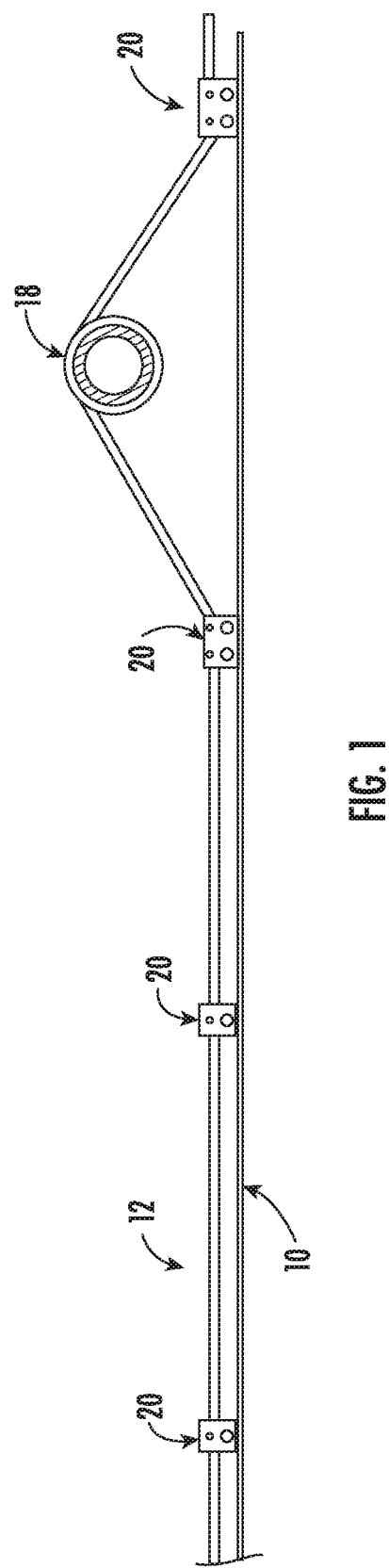
FIG. 1 is a side view of a catenary type arrangement of a contact wire and safety rope in accordance with embodiments of the present disclosure.
Figure 2:
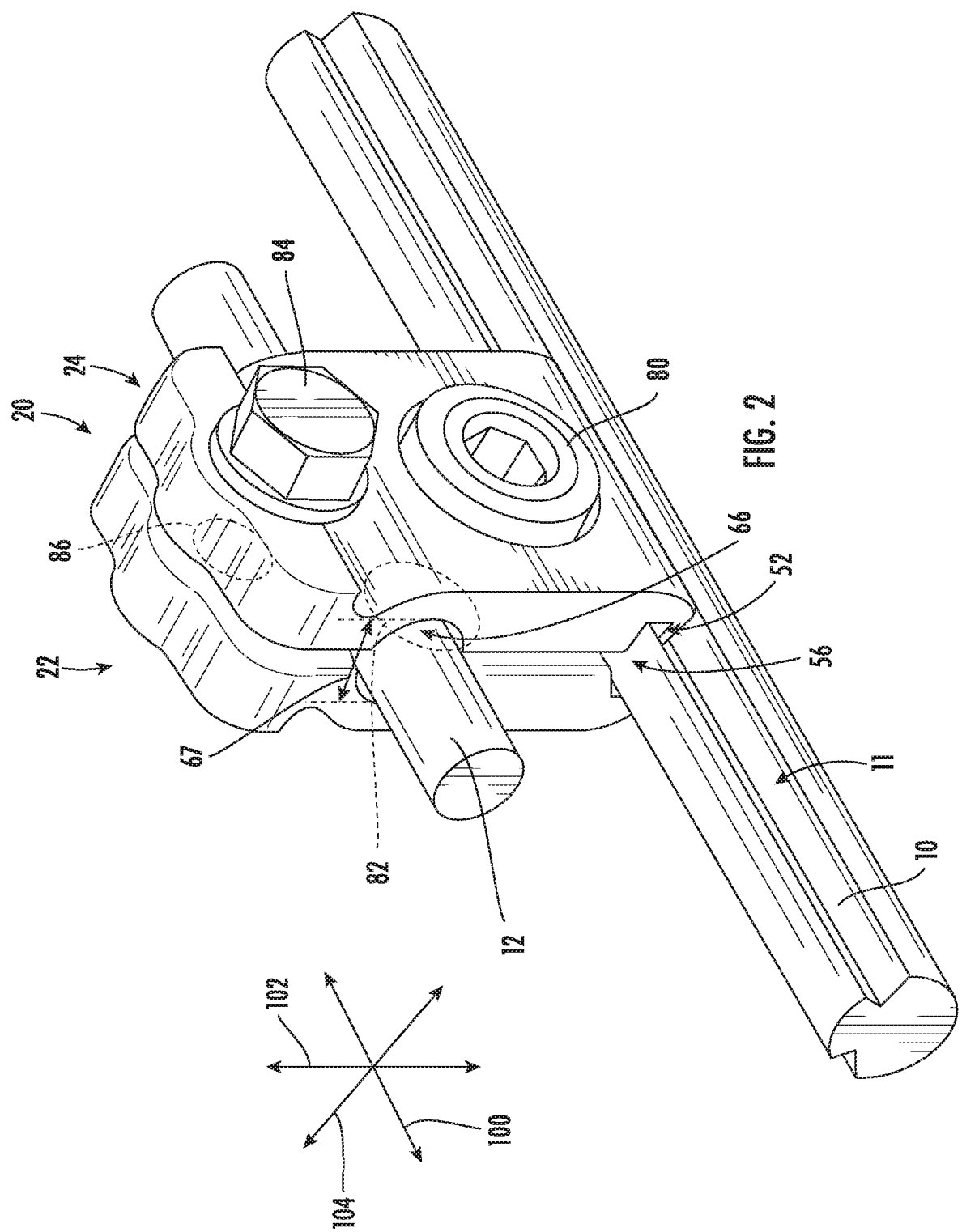
FIG. 2 is a perspective view of a contact wire clamp in accordance with some embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, one embodiment of a catenary type arrangement of a contact wire 10 and a safety rope 12 is provided. The contact wire 10 is generally in contact with a rail car to provide electricity to the rail car. The safety rope 12 provides a back-up support for the system should the contact wire 10. The contact wire 10 and safety rope 12 are generally provided in an overhead environment, as shown. Further, multiple contact wire clamps 20 support the contact wire 10 and the safety rope 12, and a cantilevered support member 18 provides further support for the safety rope 12.

Referring now to FIGS. 2 through 5, embodiments of contact wire clamps 20 in accordance with the present disclosure are provided. Contact wire clamps 20 in accordance with the present disclosure advantageously provide numerous advantages relative to known clamps, in particular with respect to the relationship of the contact wire clamp with the safety rope 12. For example, contact wire clamps 20 in accordance with the present disclosure advantageously provide improved grip strength on safety ropes 12, and in particular safety ropes 12 formed from poly-paraphenylene terephthalamide (conventionally known as KEVLAR) and; or having rubber jackets, such that the risk of slippage of the safety rope 12 from the contact wire clamp 20 is reduced or eliminated.

Referring now to FIGS. 2 through 5, embodiments of contact wire clamps 20 in accordance with the present disclosure are provided. A clamp 20 in accordance with the present disclosure includes a first clamp body 22 and a second clamp body 24 which are connected and which face each other to form a clamp region therebetween. A contact wire 10 and a safety rope 12 may be inserted into the clamp region and may contact the first clamp body 22 and second clamp body 24 during usage of the clamp. Various features of the first and second clamp bodies 22, 24 as discussed herein facilitate the advantageous reduced slippage risk provided by use of such clamps 20.

In exemplary embodiments, the first clamp body 22 and/or second clamp body 24 are formed from a suitable metal, such as in some embodiments bronze or a bronze alloy. Other suitable metals, such as aluminum, steel, or alloys thereof, may also be utilized. In some embodiments, the first clamp body 22 and second clamp body 24 are formed from the same material, while in other embodiments, the first clamp body 22 and second clamp body 24 are formed from different materials.

Figure 3:
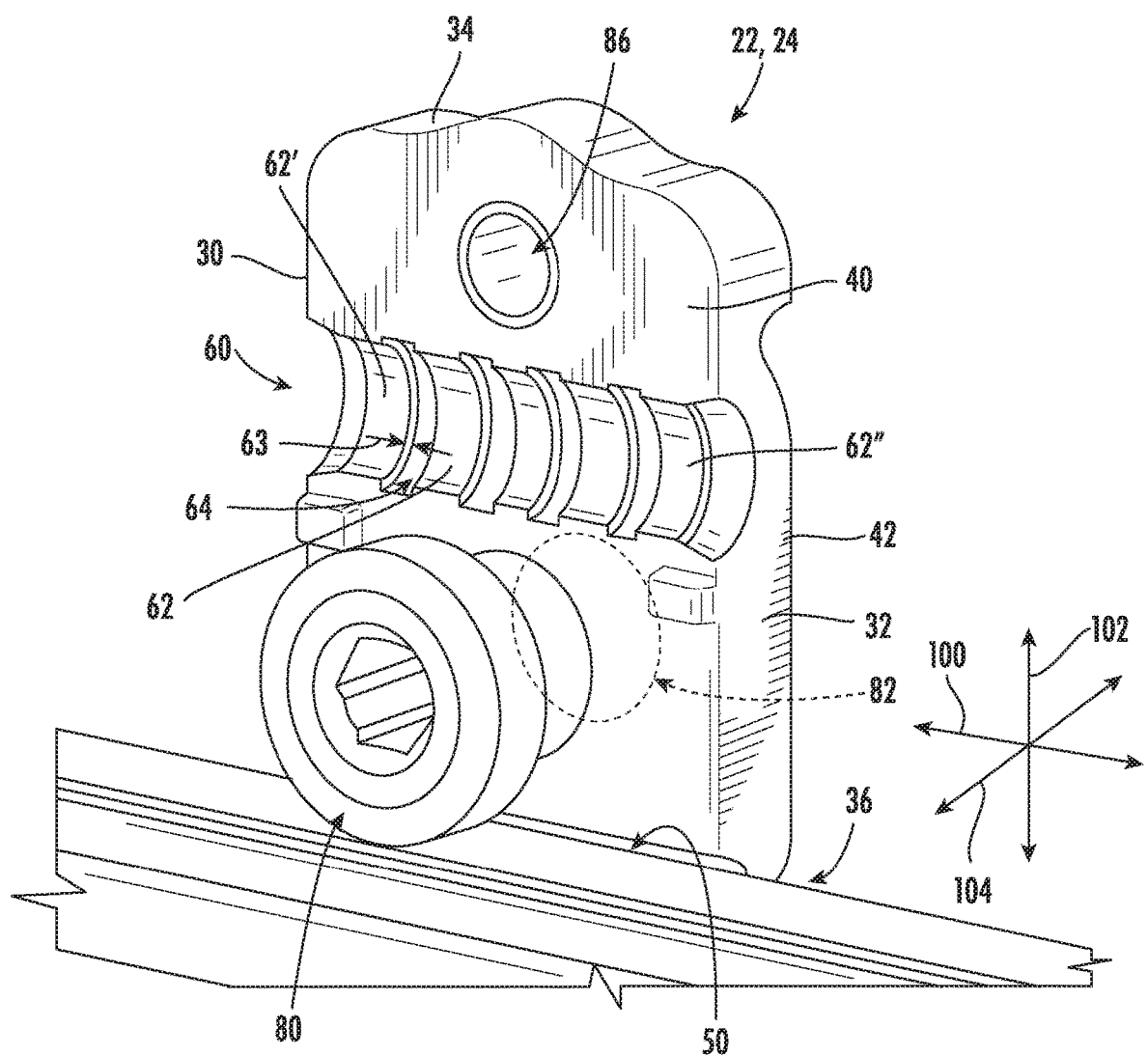
FIG. 3 is a perspective view of a clamp body of the contact wire clamp of FIG. 2.
Figure 4:
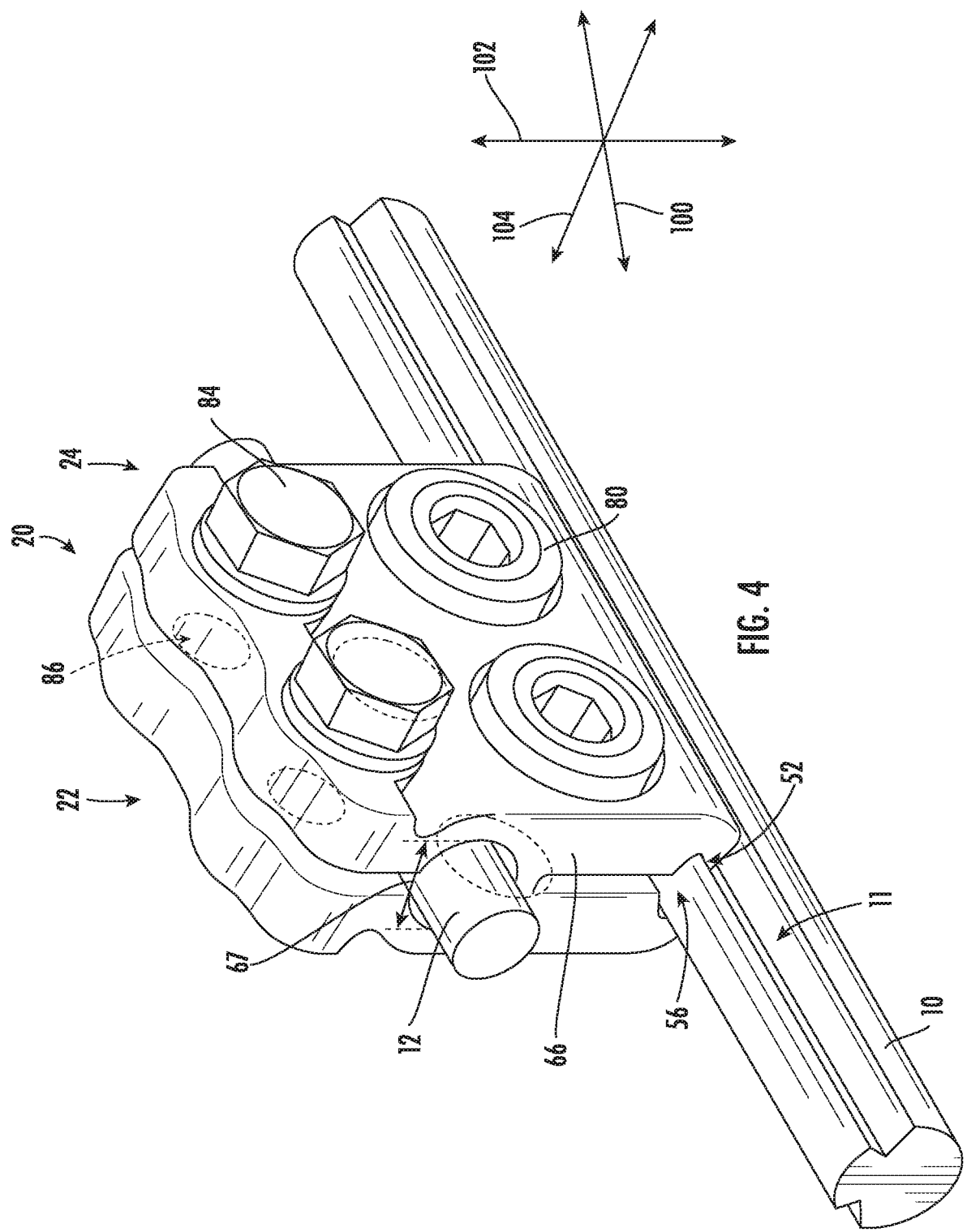
FIG. 4 is a perspective view of a contact wire clamp in accordance with other embodiments of the present disclosure.
Figure 5:
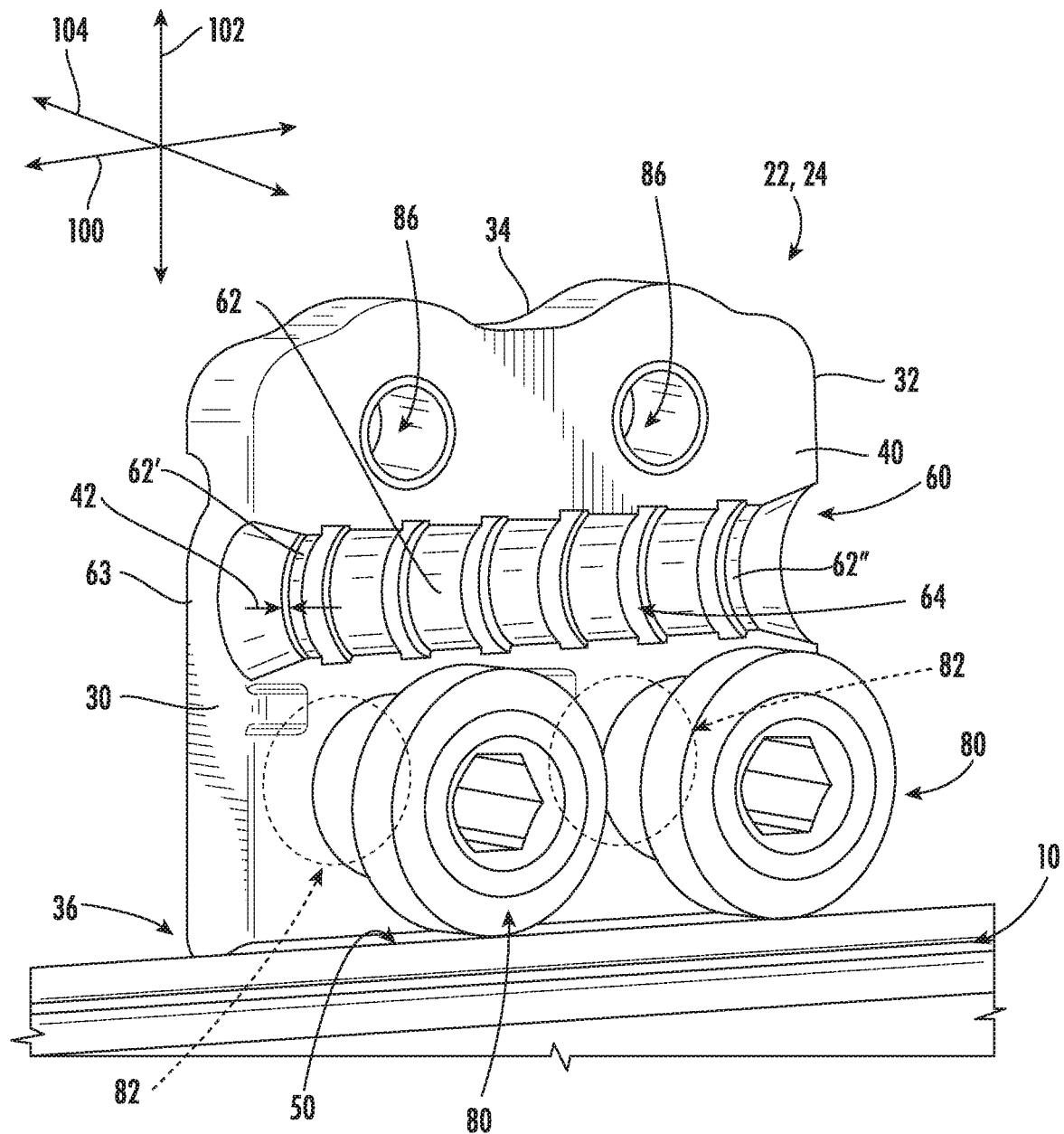
FIG. 5 is a perspective sectional view of a clamp body of the contact wire clamp of FIG. 4.

FIGS. 3 and 5 illustrate embodiments of a clamp body which could serve as the first clamp body 22 and/or second clamp body 24. Accordingly, the below description of a clamp body 22, 24 may apply to one or both of the first clamp body 22 and/or second clamp body 24. First and second clamp bodies 22, 24 may, for example, be identical, or may be non-identical.

As shown, a clamp body 22, 24 extends along a longitudinal axis 100 between a first end 30 and a second end 32, and along a vertical axis 102 between a top 34 and a bottom 36. The clamp body 22, 24 further extends along a transverse axis 104 between an inner surface 40 and an outer surface 42.

A contact wire channel 50 may be defined in the clamp body 22, 24, such as in the inner surface 40 and/or bottom 36. The channel 50 may, for example, extend between the first end 30 and second end 32, such as along the longitudinal axis 100. Contact wire channel 50 may, for example, define a protrusion 52 which extends into a cutout 11 on the contact wire 10. A portion of the contact wire 10 may fit within the contact wire channel 50, and a portion of the contact wire 10 may extend vertically from the bottom 36 of the channel 50, such that the contact wire 10 "hangs" from the clamp body 22, 24 and clamp 20 generally.

A safety rope channel 60 may be defined in the clamp body 22, 24, such as in the inner surface 40. The channel 60 may, for example, extend between the first end 30 and second end 32, such as along the longitudinal axis 100. In exemplary embodiments, the safety rope channel 60 and the contact wire channel 50 may be parallel to each other. Safety rope channel 60 and contact wire channel 50 may be spaced apart from each other, such as in exemplary embodiments along the vertical axis 102.

As shown safety rope channel 60 may include a plurality of ridges 62. The ridges 62 may be discrete raised portions of the body 22, 24 which are defined in the safety rope channel 60, as shown. The ridges 62 may be spaced apart from neighboring ridges 62, such as along the longitudinal axis 100, to define a plurality of troughs 64. Each trough 64 may thus be defined between neighboring ridges 62. The troughs 64 may thus be spaced apart from neighboring troughs 64, such as along the longitudinal axis 100.

In exemplary embodiments, as shown, the safety rope channel 60 is an arcuate channel, thus having an arcuate cross-section when viewed from an end 30, 32 of the body 22, 24. Additionally or alternatively, in exemplary embodiments, as shown, the ridges 62 are arcuate ridges, thus having arcuate cross-sections when viewed from an end 30, 32 of the body 22, 24. Additionally or alternatively, in exemplary embodiments, as shown, the troughs 64 are arcuate ridges, thus having arcuate cross-sections when viewed from an end 30, 32 of the body 22, 24.

A maximum height 63 may be defined for each of the ridges 62. The maximum height 63 may be defined from the inner surface 40 and tangentially the inner surface 40, as shown. In some embodiments, the maximum height 63 of each of the plurality of ridges 62 may be equal to the maximum heights 63 of all other ridges 62 in the plurality of ridges 62. In other embodiments, the maximum height 63 of each of the plurality of ridges 62 may be different from the maximum height 63 of one or more other ridges 62 in the plurality of ridges 62. For example, the plurality if ridges 62 may include a ridge 62' which is most proximate the first end 30 and a ridge 62" which is most proximate the second end 32. In some embodiments, the maximum heights of ridges 62' and 62" may be greater than the maximum heights of the remaining ridges 62 in the plurality of ridges 62.

When the first clamp body 22 and second clamp body 24 are assembled together to form a contact wire clamp 20, the inner surfaces 40 may face each other. Accordingly, the contact wire channels 50 may face each other, such that a contact wire passage 56 is formed thereby. Further, the safety rope channels 60 may face each other, such that a safety rope passage 66 is formed thereby. Further, in exemplary embodiments, each ridge 62 of the first clamp body 22 may align with a ridge 24 of the second clamp body 24 to form a generally annular ridge 24. Additionally, in exemplary embodiments, each trough 64 of the first clamp body 22 may align with a trough 64 of the second clamp body 24 to form a generally annular trough 64.

A maximum diameter 67 may be defined for the safety rope passage 66 at any location along the length of the safety rope passage 66, such as along the longitudinal axis 100. In exemplary embodiments, a maximum diameter 67 at any one of the plurality of ridges 62 (and thus, in exemplary embodiments, at aligned ridges 62 of the first and second clamp bodies 22, 24), is between 15% and 45%, such as between 20% and 30%, less than a maximum diameter 67 at any one of the plurality of troughs 64 (and thus, in exemplary embodiments, at aligned troughs 64 of the first and second clamp bodies 22, 24).

As shown, one or more mechanical fasteners may connect the first clamp body 22 and second clamp body 24 together. For example, one or more first mechanical fasteners 80 may be utilized, and each mechanical fastener 80 may extend, such as along the transverse axis 104, through a bore 82 in the first clamp body 22 and the second clamp body 24. The bores 82 in the first clamp body 22 and/or second clamp body 24 may be tapped or untapped. In exemplary embodiments, for example, the first mechanical fasteners 80 may be bolts, reverse bolts, hollow screws, or studs.

In exemplary embodiments, as shown, each first mechanical fastener 80 may be disposed between the contact wire channels 50 (and contact wire passage 56 formed thereby)

and the safety rope channels 60 (and safety rope passage 66 formed thereby), such as along the vertical axis 102.

In some embodiments, one or more second mechanical fasteners 84 may be utilized, and each mechanical fastener 84 may extend, such as along the transverse axis 104, through a bore 86 in the first clamp body 22 and the second clamp body 24. The bores 86 in the first clamp body 22 and/or second clamp body 24 may be tapped or untapped. In exemplary embodiments, for example, the second mechanical fasteners 85 may be bolts, reverse bolts, hollow screws, or studs. In some embodiments, the second mechanical fasteners 84 are the same as the first mechanical fasteners 80. In other embodiments, the second mechanical fasteners 84 are different from the first mechanical fasteners.

In exemplary embodiments, the second mechanical fasteners 84 are spaced from the first mechanical fasteners 80 by the safety rope channels 60 (and safety rope passage 66 formed thereby), such as along the vertical axis 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A contact wire clamp, comprising:
   a first clamp body and a second clamp body, the first clamp body and second clamp body each defining a contact wire channel and a safety rope channel, the safety rope channel comprising a plurality of ridges, each of the plurality of ridges spaced apart from neighboring ridges to define a plurality of troughs, wherein the safety rope channel of the first clamp body extends between a first end and a second end, and wherein maximum heights of a ridge of the plurality of ridges most proximate the first end and a ridge of the plurality of ridges most proximate the second end are greater than maximum heights of remaining ridges of the plurality of ridges of the first clamp body, and wherein the safety rope channel of the second clamp body extends between a first end and second end, and wherein maximum heights of a ridge of the plurality of ridges most proximate the first end and a ridge of the plurality of ridges most proximate the second end are greater than maximum heights of remaining ridges of the plurality of ridges of the second clamp body; and
   a mechanical fastener connecting the first clamp body and the second clamp body together,
   wherein the safety rope channels of the connected first clamp body and second clamp body face each other and together form a safety rope passage.

2. The contact wire clamp of claim 1, wherein the contact wire channel and the safety rope channel of the first clamp body are parallel to each other, and wherein the contact wire channel and the safety rope channel of the second clamp body are parallel to each other.

3. The contact wire clamp of claim 1, wherein the ridges of the first clamp body and the second clamp body are arcuate ridges.

4. The contact wire clamp of claim 1, wherein the troughs of the first clamp body and the second clamp body are arcuate troughs.

5. The contact wire clamp of claim 1, wherein a maximum diameter of the safety rope passage at any one of the plurality of ridges is between 15% and 45% less than a maximum diameter of the safety rope passage at any one of the plurality of troughs.

6. The contact wire clamp of claim 1, wherein the mechanical fastener is disposed between a contact wire passage defined by the contact wire channels of the first clamp body and second clamp body and the safety rope passage.

7. The contact wire clamp of claim 1, wherein the mechanical fastener is a first mechanical fastener, and further comprising a second mechanical fastener, the second mechanical fastener spaced from the first mechanical fastener by the safety rope passage.

8. The contact wire clamp of claim 1, wherein the first clamp body and the second clamp body are each formed from bronze or a bronze alloy.

9. A contact wire clamp, comprising:
   a first clamp body and a second clamp body each extending between a first end and a second end, the first clamp body and second clamp body each defining a contact wire channel and a safety rope channel which extend in parallel to each other, the safety rope channel comprising a plurality of arcuate ridges, each of the plurality of ridges spaced apart from neighboring ridges to define a plurality of arcuate troughs, wherein maximum heights of a ridge of the plurality of ridges most proximate the first end and a ridge of the plurality of ridges most proximate the second end are greater than maximum heights of remaining ridges of the plurality of ridges of the first clamp body, and wherein maximum heights of a ridge of the plurality of ridges most proximate the first end and a ridge of the plurality of ridges most proximate the second end are greater than maximum heights of remaining ridges of the plurality of ridges of the second clamp body; and
   a mechanical fastener connecting the first clamp body and the second clamp body together,
   wherein the safety rope channels of the connected first clamp body and second clamp body face each other and together form a safety rope passage.

10. The contact wire clamp of claim 9, wherein a maximum diameter of the safety rope passage at any one of the plurality of ridges is between 15% and 45% less than a maximum diameter of the safety rope passage at any one of the plurality of troughs.

11. The contact wire clamp of claim 9, wherein the mechanical fastener is disposed between a contact wire passage defined by the contact wire channels of the first clamp body and second clamp body and the safety rope passage.

12. The contact wire clamp of claim 9, wherein the mechanical fastener is a first mechanical fastener, and further comprising a second mechanical fastener, the second mechanical fastener spaced from the first mechanical fastener by the safety rope passage.

13. The contact wire clamp of claim 9, wherein the first clamp body and the second clamp body are each formed from bronze or a bronze alloy.

14. A contact wire clamp, comprising:
    a first clamp body and a second clamp body, the first clamp body and second clamp body each defining a contact wire channel and a safety rope channel, the safety rope channel comprising a plurality of ridges, each of the plurality of ridges spaced apart from neighboring ridges to define a plurality of troughs, wherein the safety rope channel of the first clamp body and the safety rope channel of the second clamp body each extend between a first end and a second end, and wherein a maximum height of a ridge of the plurality of ridges most proximate at least one of the first end or the second end of at least one on the first clamp body or the second clamp body is greater than maximum heights of remaining ridges of the plurality of ridges of the at least one of the first clamp body or the second clamp body; and a mechanical fastener connecting the first clamp body and the second clamp body together, wherein the safety rope channels of the connected first clamp body and second clamp body face each other and together form a safety rope passage.

15. The contact wire clamp of claim 14, wherein the contact wire channel and the safety rope channel of the first clamp body are parallel to each other, and wherein the contact wire channel and the safety rope channel of the second clamp body are parallel to each other.

16. The contact wire clamp of claim 14, wherein the ridges of the first clamp body and the second clamp body are arcuate ridges.

17. The contact wire clamp of claim 14, wherein a maximum diameter of the safety rope passage at any one of the plurality of ridges is between 15% and 45% less than a maximum diameter of the safety rope passage at any one of the plurality of troughs.

18. The contact wire clamp of claim 14, wherein the mechanical fastener is disposed between a contact wire passage defined by the contact wire channels of the first clamp body and second clamp body and the safety rope passage.

* * * * *